United States Patent [19]

Roller

[11] 4,247,371
[45] Jan. 27, 1981

[54] PRECIPITATING SCALE-FORMING COMPOUNDS FROM WATER, AND FORMING FRESH WATER

[76] Inventor: Paul S. Roller, 1440 N St., N.W., Washington, D.C. 20005

[21] Appl. No.: 971,181

[22] Filed: Dec. 20, 1978

Related U.S. Application Data

[63] Continuation-in-part of Ser. No. 749,227, Dec. 10, 1976, abandoned, and a continuation-in-part of Ser. No. 701,999, Jul. 1, 1976, Pat. No. 4,054,493, and a continuation-in-part of Ser. No. 678,037, Apr. 19, 1976, abandoned, and a continuation-in-part of Ser. No. 531,278, Mar. 15, 1966, abandoned, and a continuation-in-part of Ser. No. 834,203, Jun. 3, 1969, abandoned, and a continuation-in-part of Ser. No. 387,585, Aug. 13, 1973, Pat. No. 3,951,752, and a continuation-in-part of Ser. No. 444,789, Feb. 22, 1974, Pat. No. 3,951,753.

[51] Int. Cl.³ .............................. C02F 1/10; B01D 1/28
[52] U.S. Cl. .................................................. 203/7; 203/11; 203/22; 203/23; 203/26; 203/34; 203/37; 203/41; 203/47; 203/73; 203/88; 203/92; 203/100; 203/DIG. 14; 202/173; 202/176; 202/177; 202/180; 159/24 B; 159/DIG. 13; 210/687; 210/714; 210/718; 210/696

[58] Field of Search .................. 203/92, 95, 88, 7, 11, 203/22, 23, 24, 26, 39, 41, 29, 47, 34, 35, 36, 37, DIG. 14, 73, 100; 202/173, 174, 176, 177, 180, 233, 234, 235; 210/42 R, 46, 56, 57, 48, 65, 38 A; 159/17 VS, 17 R, 17 P, 24 R, 24 A, 24 B, DIG. 13

[56] References Cited

U.S. PATENT DOCUMENTS

| | | | |
|---|---|---|---|
| 3,026,261 | 3/1962 | Mayfield et al. | 203/7 |
| 3,119,752 | 1/1964 | Checkovich | 203/11 |
| 3,218,241 | 11/1965 | Checkovich | 203/7 |
| 3,814,671 | 6/1974 | Roller | 203/7 |
| 3,951,752 | 4/1976 | Roller | 159/DIG. 13 |
| 3,951,753 | 4/1976 | Roller | 203/7 |
| 4,054,493 | 10/1977 | Roller | 159/DIG. 13 |

*Primary Examiner*—Wilbur L. Bascomb, Jr.

[57] ABSTRACT

Water containing dissolved compounds is preheated, and is then pressurized in stages of water pressure, while receiving a quantum of steam. Scale-forming compounds in the water are thermally precipitated, and clarified post-thermal water is formed. This is flash vaporized in stages corresponding to the stages of water pressure, and the flashed vapors are compressed to form each said quantum of steam. Alternately, the flashed vapors themselves comprise each said quantum of steam, by being induced into the water as it flows through an eductor means. Flash-cooled, post-thermal water, substantially devoid of scale-forming compounds, is employed as such, or more generally is evaporated to form fresh water and an end concentrate of dissolved compounds.

30 Claims, 6 Drawing Figures

PRECIPITATING SCALE-FORMING COMPOUNDS FROM WATER, AND FORMING FRESH WATER

This application is a continuation-in-part of my copending application, Ser. No. 749,227, filed Dec. 10, 1976, now abandoned; of Ser. No. 701,999, filed July 1, 1976, now U.S. Pat. No. 4,054,493; of Ser. No. 678,037, filed Apr. 19, 1976; Ser. No. 531,278, filed Mar. 15, 1966; and Ser. No. 834,203, filed June 3, 1969, each now abandoned; of Ser. No. 387,585, filed Aug. 13, 1973, now U.S. Pat. No. 3,951,752, and Ser. No. 444,789, filed Feb. 22, 1974, now U.S. Pat. No. 3,951,753. Subject matter of these applications not included herein is incorporated by reference.

The invention relates to removing scale-forming compounds from water, and its subsequent direct use, or evaporation to form fresh water.

The dissolved compounds in water normally include thermally precipitable, scale-forming compounds, such as calcium sulfate, alkaline-earth bicarbonates of calcium and magnesium, compounds of silica, iron, and other minor elements, such as strontium. The direct use of sea water, brackish waters and industrial process waters is hindered by the presence of these scale-forming compounds. The conversion of these waters and of the waste waters of municipalities, industry and irrigation into fresh water is rendered quite costly by their interference, for example with evaporation, which is herein chosen, and, in fact, with any other means, such as reverse osmosis.

In evaporation it has been necessary to limit the recovery of fresh water prematurely owing to scale depositing on the heat transfer surfaces. Large quantities of water are, therefore, processed to no economic avail. Seeding to divert the precipitation from heat transfer surfaces has been of limited utility.

It is a principal object of the invention to provide for the prior thermoprecipitation of scale-forming compounds from water.

Another object is to provide for minimum energy in the use of steam to effect the thermoprecipitation.

Still another object is to provide for in-process utilization of carbon dioxide formed in the thermoprecipitation.

A further object is to provide for the removal of organic vapors that may be evolved with said carbon dioxide.

Another object is to provide for reduced energy in the evaporation of water subsequent to thermoprecipitation.

With these an other objects in mind, as will become apparent from the description which follows, reference is made to the drawing in which.

Figure 1:
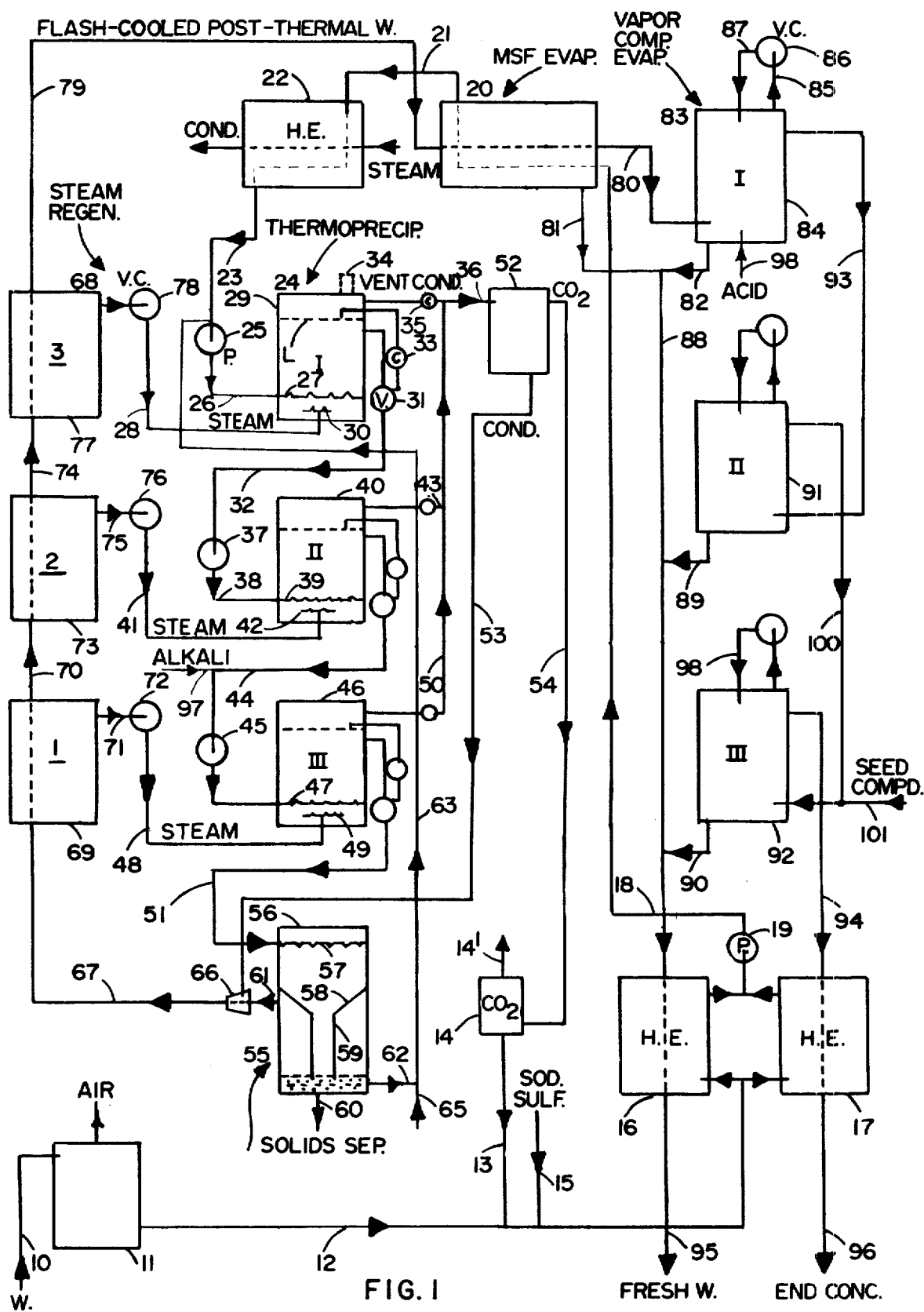
FIG. 1 is a diagrammatic representation of an apparatus for performing the invention.

In the drawing, lines connecting parts of the apparatus denote conduits, and arrow-heads on the lines the direction of fluid flow.

Figure 2:
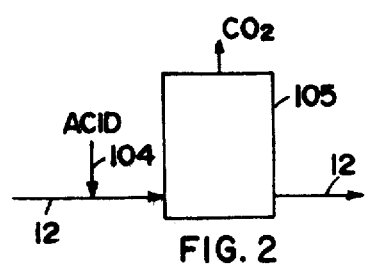
FIG. 2 is a diagram illustrating the pretreatment of water for the control of alkaline-earth bicarbonate decomposition in preheating the water before thermoprecipitation.

The water to be processed will have had suspended solids removed, generally by wet screening. Referring now to FIG. 1, for control of corrosion, it may pass from line 10 through deaerator 11 into line 12, in which it also may receive a deoxygenating agent, normally sodium sulfite, from line 15. For control of alkalinity to prevent alkaline-earth carbonate and hydroxide from precipitating during preheating of the water, it may receive carbon dioxide recycled to it from line 13 connected to carbon dioxide container 14. The carbon dioxide serves as an acid in reducing the pH of the water. For nonprecipitation of said alkaline-earth compounds in preheating to a preheat temperature of 270° F., but actually with minor difference as to preheat temperature, the pH in the case of sea water will be reduced by the carbon dioxide to about 6.4, and in the case of a brackish water to between 5.5 and 6.9, depending mainly upon the calcium and bicarbonate ion concentration in the water. Alternately, as indicated in FIG. 2, a mineral acid, normally sulfuric acid, will be added to the water to reduce the pH to the required value. While the carbon dioxide, which is recycled, is a by-product of the process, the acid needs to be purchased. However, the expense of this is minimized by the high recovery of fresh water that is achieved, and resultant relatively low volume of water to be treated. The acid may also be added, in greater amount than that for pH reduction, sufficiently to decompose the alkaline-earth bicarbonates in the water. Carbon dioxide is evolved and is separated from the water, together with air in it, in degasifier 105 of FIG. 2. While this step is shown occurring in line 12, it may take place at a higher temperature during a break in subsequent preheating of the water.

Figure 3:
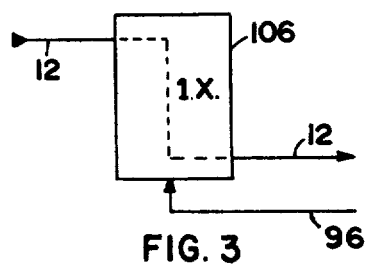
FIG. 3 is a diagram illustrating the pretreatment of water for the control of calcium sulfate precipitation in preheating the water before thermoprecipitation.

The control of calcium sulfate precipitation in preheating may be effected by removing part, for example 10% to 50%, of calcium ion in the water, sufficiently to prevent the precipitation of calcium sulfate as anhydrite at the temperature of preheat. Referring in regard to this control to FIG. 3, the water is passed from line 12 through sodium ion, cationic ion exchanger 106, in which calcium ion is exchanged for sodium ion; the so-treated water issues therefrom in the same line. An end concentrate of dissolved compounds formed in this process, being generally major in sodium content, may be employed as regenerant of said sodium ion, cationic ion exchanger 106, or any such ion exchanger, as to which it is passed from line 96 to a regeneration inlet on the cationic ion exchanger.

The reduction in calcium ion is significant in abating the control of alkaline-earth bicarbonate alkalinity. For example, when for a brackish water the pH needed to be reduced to 5.7 for non-precipitation of alkaline-earth compound during preheating of the water, upon a moderate reduction of calcium ion for the control of calcium sulfate precipitation, a lesser reduction in pH to 6.1 was sufficient.

Having been pretreated for complete non-precipitation in preheating, the water now passes from line 12 in split stream to primary preheating heat exchangers 16 and 17. Evaporator distillate and evaporator concentrate, in individual counterflow, increase the temperature of the streams, which at about 205° F. issue recombined to pump 19 and line 18. The water in said line is increased in pressure by said pump to the saturation pressure of steam at the temperature of preheat. From line 18, the water passes to a second preheating heat exchanger, which may be a liquid-liquid heat exchanger, as expressed in my U.S. Pat. Nos. 3,951,752 and 4,054,493, or it may comprise flash evaporator 20, which may be in multistage formation. The employment of a flash evaporator for preheating is advantageous in providing a high heat transfer coefficient, and a flash condensate, the cost-free obtainment of which offsets an equivalent, energy-consuming recovery of fresh water in subsequent vapor compression evaporation.

From flash evaporator 20, the water exits in line 21 at the temperature of preheat, less a heat transfer, temperature differential required in said flash evaporator. Steam-heated, heat exchanger 22 compensates for the differential. The water passes to it from line 21, exiting in line 23 at the full temperature of preheat. This is as high as possible, and feasibly may equal 270° F., assumed herein.

The preheated water is subjected to thermoprecipitation of scale-forming compounds, the temperature of which is generally above 300° F., and preferably between 350° F. and 400° F. The thermoprecipitation is conducted in stages, in each of which the pressure of the water is predetermined, while its temperature increases from an incoming value by an increment resulting from condensation in the water of a quantum of steam. By staging the thermoprecipitation, a great saving in energy is effected in that required to subsequently regenerate the steam employed in the thermoprecipitation.

Thermoprecipitator 24, having illustratively three stages I, II and III, comprises an equal plurality of thermoprecipitation vessels and combined pump means, wherein said pump means is intermediate and in communication with successive said vessels. In respect to the first stage, pump 25 has its inlet connected to line 23 delivering preheated water, and its outlet connected to line 26 leading to an inlet on vessel 29 and water distributor 27 situated at the lower end thereof. Pump 25 effects an incremental increase in pressure of the water in vessel 29, the magnitude of which is regulated by pressure control means 31 in outlet line 32. A quantum of steam, at a pressure differentially greater than said pressure of the water in vessel 29, is passed to the water from line 28 and steam distributor 30, situated near water distributor 27. Condensation of the quantum of steam in the water increases its temperature by an increment, and its maximum temperature will equal the saturation temperature of the quantum of steam at the pressure of the water in vessel 29.

As a result of said increment in temperature of the water, scale-forming compounds, notably calcium sulfate, precipitate in suspension in it. In the presence of alkaline-earth bicarbonates in the preheated water, alkaline earth compounds precipitate, including calcium carbonate and/or magnesium hydroxide, while carbon dioxide is evolved. An excess in the quantum of steam can occur after the water has reached said maximum temperature. The excess will be present in the water as a gas. It will then reduce the partial pressure of evolved carbon dioxide, and so tend to accelerate the thermal decomposition of alkaline-earth bicarbonates. It serves also to sweep evolved carbon dioxide from the water.

From vessel 29 of stage I, water containing in suspension a precipitate of scale compounds issues in line 32, the outlet to which is situated below liquid level L, the height of which is regulated by liquid level control means 33 in cooperation with pressure control means 31. Carbon dioxide if evolved, non-condensibles reduced by deaeration, water vapor, excess steam if employed, and organic vapors that may be thermally evolved, pass into the vapor space above liquid level L to vent condenser means 34. A similar vent condenser means is implied for each of the vessels of the other stages. Alternately, and for clarity of presentation, the plurality of said vent condenser means is replaced by unit condenser 52. The gases and vapors exit from said vapor space into line 36 to unit condenser 52 at a rate of flow regulated by pressure control means 35.

From said line 32, the water with its suspension of precipitate of scale compounds passes from stage I to the inlet of pump 37, which is intermediate stage I and stage II. Pressurized by said pump, the water issues into line 38 to water distributor 39 in vessel 40 of stage II, in which the water pressure is now an increment greater than in stage I. A quantum of steam passes from line 41 to steam distributor 42 in said vessel 40 and further heats the water therein. Henceforward, the events in stage II are similar to those which have been described for stage I. As a result of the increment in temperature of the water in stage II, due to said quantum of steam, more precipitate of scale compounds is formed, which accumulates with that from stage I; and more carbon dioxide may be evolved, exiting into lines 43 and 36 to unit condenser 52, in which it is combined with the carbon dioxide of stage I.

From vessel 40 of stage II, water containing in suspension the combined precipitate of stage II and stage I exits into line 44 to pump 45, intermediate stage II and last stage III. Pressurized by an increment over the pressure in stage II, the water passes to distributor 47 in vessel 46 of stage III, and a quantum of steam passes from line 48 to steam distributor 49 in said vessel. Owing to the still further heating and resultant increment in temperature of the water, more precipitate of scale compounds is formed in stage III. Carbon dioxide, if it is evolved, exits in lines 50 and 36 to unit condenser 52. Stage III being the last, water, which is at the temperature of thermoprecipitation, and thus at its maximum temperature, containing in suspension a precipitate of scale compounds successively accumulated from all the stages, exits from vessel 46 into line 51 to solids separator 56 for the removal of said precipitate from the water to form a clarified, post-thermal water.

Figure 4:
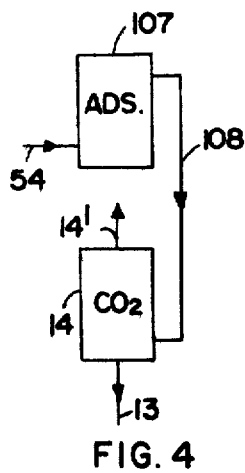
FIG. 4 is a diagram illustrating the purification of carbon dioxide, that may be evolved during thermoprecipitation.

In unit condenser 52, water vapor, and excess steam if provided, condense and issue as hot water in line 53. Carbon dioxide, accumulated from all the stages with non-condensibles remaining after preferred deaeration, passes into line 54 to container 14 and before-mentioned line 13. Alternately, in the presence of evolved organic vapors, the carbon dioxide passes to receptable 107, shown in FIG. 4, containing an adsorbent of organic vapors, normally activated carbon. The carbon dioxide with non-condensibles thence continues in line 108 to container 14 and line 13. Vent 14' on container 14 provides for the discharge of excess carbon dioxide resulting from bicarbonate decomposition during thermoprecipitation. A trace of non-condensibles left in the water after deaeration and deoxygenation will accumulate in recycled carbon dioxide exceedingly slowly, due to its inclusion in said discharge of excess carbon dioxide.

Undecomposed alkaline-earth bicarbonate may still exist in last stage III of thermoprecipitator 24. Although the water will be alkaline in the presence of a precipitate of alkaline-earth carbonate and/or hydroxide, the alkalinity may not be sufficient to convert remaining bicarbonate to said precipitate. In order to do so, an alkali, generally lime, may be added to the water in last stage III, for example, from line 97 to line 44 and the inlet to pump 45 preceding vessel 46 of said stage. The thermally innate and alkali-augmented alkalinity is considered favorable to the thermoprecipitation of calcium sulfate as anhydrite.

Although solids separator 55 may be a filtering means, it is preferably a sedimentation means, the utility of which is favored by the high temperature. The water, with suspended precipitate of scale compounds, issued from thermoprecipitator 24, passes from outgoing line 51 to distributor 57 situated in chamber 56 of solids separator 55. It flows downward into central compartment 58, and reversing direction at the end of cylindrical extension 59, deposits said precipitate at the bottom of chamber 56, while flowing upward in an annulus to outlet line 61.

A sludge of precipitate of scale compounds reaching to the end of cylindrical extension 59, is withdrawn through line 60. A portion of the precipitate may be employed as seed to accelerate the thermoprecipitation, for example, by recirculating it from line 62 to line 63 and the inlet to pump 25 and vessel 29 of stage I. Foreign substances may also be employed as seed, alternately or in combination with said precipitate of scale compounds, and may comprise the compounds of anhydrite, magnesium hydroxide, or a compound of ferric ion, added to the water in stage I from line 65 collinear with said line 63.

The post-thermal water in line 61 lacks the water vapor and excess quanta of steam that had been separated in thermoprecipitator 24. They are now combined with it as hot condensate from unit condenser 52 through line 53 leading to eductor means 66 through which the post-thermal water flows, and from which it issues as post-thermal water proper in line 67.

From the post-thermal water, the quanta of steam are regenerated in steam regenerator 68, which comprises a plurality of intercommunicating flash vaporization stages 1, 2 and 3 corresponding, respectively, to stages III, II and 1 of thermoprecipitator 24. Each flash vaporization chamber communicates with a vapor compressor that receives the flashed vapor and upon compressing it forms a quantum of steam. From line 67, the post-thermal water passes to chamber 69 of stage 1 of said steam regenerator, in which it is flash vaporized while thereupon partially cooling. The flashed vapor issues into line 71 to the inlet of vapor compressor 72, from which compressed vapor exits in line 48 as a quantum of steam at a saturation pressure differentially greater than the pressure of the water in vessel 46 of corresponding stage III, to which it passes from said line 48. From chamber 69, the post-thermal water passes into line 70 to chamber 73 of flash vaporization stage 2; flashed vapor which is formed issues into line 75 to the inlet of vapor compressor 76, and compressed by it exits in line 41 as a quantum of steam passed to the water in vessel 40 of corresponding stage II. The post-thermal water, which is now further cooled by the flashing, issues into line 74 to chamber 77 of last flash vaporization stage 3. The flashed vapor from said chamber passes to vapor compressor 78, and compressed by it exits as a quantum of steam in line 28 to the water in vessel 29 of corresponding stage I. Flash-cooled, post-thermal water, which exits from last stage III, is similar in temperature and composition to the water at its preheat temperature, except for the near absence of scale-forming compounds.

By flash vaporizing in stages, energy is saved in regenerating the steam for thermoprecipitation. The energy is that of compressing the flashed vapor, and is dependent upon the compression ratio. The greater the number of stages the less the individual compression ratio, and the less the net energy relative to a single stage of vapor compression. I have determined that the energy is inversely proportional to the number of stages. Thus, while for a single stage the energy is approximately 39 kwh per 1000 gal of water, it reduces to 13 kwh for three stages and 5 kwh for eight stages. Pluralizing thermoprecipitator 24 into corresponding stages provides for definition in distributing the quanta of steam to the water.

Figure 5:
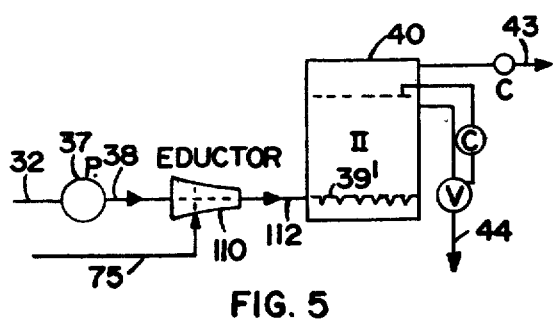
FIG. 5 is a diagram illustrating an alternate method of forming a quantum of steam for thermoprecipitation.

Alternately to compressing the flashed vapor to form a quantum of steam, the flashed vapor itself may be taken to constitute it, in virtue of the flashed vapor being passed to an eductor means, in which it is induced into the water at a point of high velocity and low pressure. The eductor means and the before-mentioned pump means form a combination in thermoprecipitator 24, the eductor means following the pump means and receiving pressurized water from it. A typical arrangement is shown in FIG. 5, which relates to stage II of thermoprecipitator 24, and specifically pump 37 and eductor 110. Water containing scale compound precipitate in suspension issues from stage I into line 32, which is connected to an inlet on pump 37. Pressurized, the water issues into line 38 to eductor 110. Vapor flashed from chamber 73 of matching stage 2 into line 75 passes therefrom to an inlet on eductor 110. Water and vapor exit from said eductor into line 112 to water distributor 39' in vessel 40. At least partially condensed in the water before it reaches said vessel and thereafter completely condensed in it, the flashed vapor, now regarded as a quantum of steam, increases the temperature of the water incrementally over than in stage I. The maximum temperature of the water corresponds to that of saturated steam at the controlled pressure of the water in vessel 40. Vapor which may be in excess of that required to reach said maximum temperature flows through the water into the vapor space above liquid level L.

The preheated water previous to entering pump 25 may receive scale compound precipitate recirculated to it from line 63. In respect to stage I, the water entering it will thus contain scale compound precipitate in suspension just as for the subsequent stages, which acquire it, however, through thermoprecipitation in previous stages.

In the presence of flashed vapor that has been induced into the water, scale-forming compounds may precipitate as scale on the walls of an eductor means and the ducts after it. This effect is opposed, however, and may be countervailed, by the scale compound precipitate in suspension, serving as seed for the precipitation, and so diverting it from the walls of the eductor. A slight amount of scale, if formed on the walls, nevertheless, is not critical as is the case for heat exchange.

Through the multistaging of thermoprecipitator 24, the ratio of flashed vapor to water entering an eductor means is lessened. Operation of said eductor means is thereby simplified and net energy is saved. Under certain circumstances, however, particularly when the content of scale-forming compounds is small, a single eductor means may suffice. The multistaging above expressed may then be replaced by a single stage of thermoprecipitation and single vessel thereof and, correspondingly, a single stage of flash vaporization and single chamber thereof.

Referring now to the flash-cooled, post-thermal water in line 79, the virtual absence of scale-forming compounds therein makes it potentially useful as a product of the process, either as such or upon reducing its temperature substantially to the initial temperature of the water by its preheating said water. More generally, the flash-cooled, post-thermal water is converted to fresh water by evaporation or, particularly after its temperature has been reduced, by any other method. Evaporation, which is focused upon herein, may be performed directly, for example, in a multiple effect evaporator as such, or in sequence with a vapor compression evaporator, as described in my U.S. Pat. No. 3,951,753.

In one mode of evaporation according to the process of this invention, the flash-cooled, post-thermal water is reduced in temperature is not less than its boiling point at atmospheric pressure in a flash evaporator, which may be in multistage, serving as a preheating heat exchange means, and is thence evaporated in a vapor compression evaporator. The latter is preferably arranged in stages of increasing concentration, whereby the concentrates of higher boiling temperature, requiring enhanced energy for their evaporation, are restricted in volume. The stage distillates of the evaporator are combined to form evaporator distillate, and the sequentially evaporated concentrate issues from the last stage as evaporator concentrate. From line 79 then, the flash-cooled, post-thermal water, at a denoted preheat temperature of 270° F., passes to flash evaporator 20 and, reduced in temperature to about 215° F., exits in line 80 to stage I, chamber 84 of vapor compression evaporator 83, which illustratively has three stages I, II and III. Typically as to compression of the vapors, and referring to stage I, vapor of the boiling water enters line 85 to vapor compressor 86 and issues in line 87 as a heating medium, while condensing to form stage I distillate. This issues from chamber 84 to line 82 connected to distillate collecting line 88, while stage I concentrate issues in line 93 to chamber 91 of stage II. Stage II distillate passes from line 89 to said collecting line, while stage II concentrate passes from line 100 to chamber 92 of last stage III. From the last stage, distillate exits into line 90 to collecting line 88, and the combined distillate therein, including flash condensate of flash evaporator 20 from line 81, issues to primary preheating heat exchanger 16, from which it exits into line 95 as fresh water. Also from last stage III, evaporator concentrate exits into line 94 to primary preheating heat exchanger 17, from which its exits as end concentrate of dissolved compounds in line 96.

As the water concentrates in evaporation, magnesium compounds tend to hydrolyze and form a precipitate of magnesium hydroxide. In order to prevent this, the pH of the water may be decreased to below neutral by acidification, which also tends to inhibit priming and mist formation during evaporation. From line 98, an acid, generally sulfuric acid, may be added to the water in vapor compression evaporator 83, preferably in stage I, chamber 89 thereof.

Because of the prior removal of scale-forming compounds by thermoprecipitation, the recovery of fresh water in evaporation is exceptionally high without prospect of scaling. For sea water, it is estimated at 83%, and in the case of a brackish water containing 3100 parts per million of dissolved compounds at 94%. Thenceforth, having exceeded saturation, calcium sulfate may precipitate as anhydrite. The recovery may be enhanced by seeding this precipitation in the last stage of evaporation, so that, to a degree at least, it does not occur on heat exchange surfaces. From line 101, anhydrite as seed may be added to the water in chamber 92 of last stage III; alternately, a portion of the precipitate of scale compounds, which generally contains anhydrite, may be added as seed from solids separator 55 and line 62 connected to said line 101.

In an alternate and usually preferred mode of evaporation, the flash-cooled, post-thermal water is evaporated directly at its temperature of preheat in a first vapor compression evaporator, which may be arranged in multistage. First evaporator distillate and first evaporator concentrate are reduced in temperature to not less than the boiling point of said concentrate at atmospheric pressure, while preheating water toward its temperature of preheat. Temperature-reduced, first evaporator concentrate is evaporated in a second vapor compression evaporator, which may comprise but a single stage, the water of which may be seeded, as described for enhanced recovery.

Figure 6:
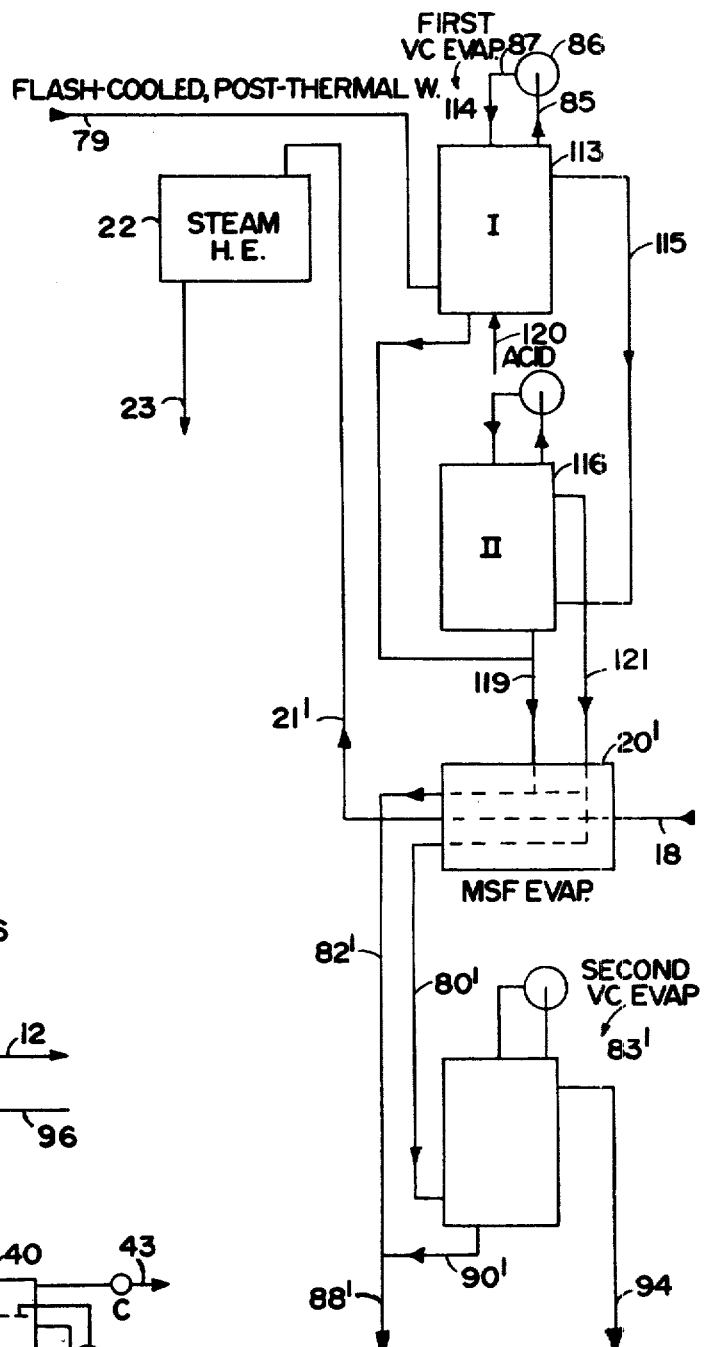
FIG. 6 is a diagram illustrating an alternate mode of evaporating flash-cooled, post-thermal water.

Referring specifically to FIG. 6, flash-cooled, post-thermal water at it preheat temperature of about 270° F. passes from line 79 to stage I, chamber 113 of first vapor compression evaporator 114, which illustratively comprises two stages I and II. Stage I concentrate issues in line 115 to chamber 116 of last stage II, from which first evaporator concentrate exits in line 121 to flash evaporator 20' as preheating heat exchange means, which receives water to be preheated from line 18. Reduced in temperature to not less than its boiling point at atmospheric pressure, said first evaporator concentrate exits in line 80' to second vapor compression evaporator 83', which illustratively comprises a single stage. From it, second evaporator concentrate exits in line 94 to primary preheating heat exchanger 17 and into outlet line 96 as end concentrate of dissolved compounds. First evaporator distillate in line 119 concurrently passes to said flash evaporator 20', and, together with flash condensate thereof, exits in line 82'. Into said line passes also second evaporator distillate from line 90'; and the combined distillate issues into line 88' to primary preheating heat exchanger 16 and into outlet line 95 as fresh water.

As hereinabove with respect to vapor compression evaporator 83 and for the same reasons, from line 120 acid may be added to the water in stage I, chamber 113 of first vapor compression evaporator 114.

Several advantages accrue to said alternate mode of evaporation involving first and second vapor compression evaporators against the equivalent of a second vapor compression evaporator alone. An evaporation temperature of 270° F. comes into comparison with that at 215° F. At the higher temperature, thermal diffusion across the heat transfer surface film is much more rapid, and the heat transfer coefficient is correspondingly some 50% or more greater than at the lower temperature of evaporation. Then again, the volume of the vapor, on which the size of the vapor compressor depends, is 10.1 cu. ft. per lb at 270° F. against a high of 25.4 cu. ft. per lb at 215° F. These differences are rendered preponderant by the fact that about 90% of the total recovery of fresh water takes place in said first vapor compression evaporator. Finally, evaporator distillate and evaporator concentrate entering flash evaporator 20' are at a higher temperature than flash-cooled, post-thermal water from which they are derived. Preheating water from line 18 flowing counter to said evaporator distillate and concentrate exits from flash evaporator 20' at a relatively high temperature. The thermal requirement of steam-heated, heat exchanger 22 is thereby much reduced, and, in the case of sea water with its high boiling point elevation, it may virtually be unrequired.

Having thus described my invention, it will be recognized that adaptations of the method and apparatus may be made that will fall within the spirit and scope of the subject matter as claimed.

I claim:

1. A process for removing from water containing dissolved compounds the scale-forming part thereof, which comprises preheating the water; pressurizing the water, which has been preheated, in stages of water pressure; passing a quantum of steam into the pressurized water in each said stage, and condensing the quantum of steam, forming in each stage further heated water, while thermoprecipitating scale-forming compounds in suspension in the water; from the last stage of water pressure, issuing further heated water containing a successively accumulated precipitate of scale compounds in suspension; separating said precipitate and forming post-thermal water; flash vaporizing, while flash cooling, said post-thermal water in flash vaporization stages corresponding to said stages of water pressure; at each said stage of flash vaporization, compressing the flashed vapor, the compressed vapor comprising said quantum of steam; and from the last stage of flash vaporization, issuing flash-cooled, post-thermal water containing dissolved compounds substantially removed of scale-forming compounds.

2. A process for removing from water containing dissolved compounds the scale-forming part thereof, which comprises preheating the water; pressurizing the water, which has been preheated, in stages of water pressure; passing pressurized water in each said stage through an eductor means; inducing a quantum of steam into the water in said eductor means at a point of high velocity and low pressure of the water, and condensing the quantum of steam, forming further heated water in each said stage, while thermoprecipitating scale-forming compounds in suspension in said further heated water; from the last stage of water pressure, issuing said further heated water containing a successively accumulated precipitate of scale compounds in suspension; separating said precipitate and forming post-thermal water; flash vaporizing, while flash cooling, said post-thermal water in flash vaporization stages corresponding to said stages of water pressure, at each said stage of flash vaporization, the vapor which has been flashed comprising said quantum of steam; and from the last stage of flash vaporization, issuing flash-cooled, post-thermal water containing dissolved compounds substantially removed of scale-forming compounds.

3. The subject matter of claim 1 or 2, each in the alternate, wherein said quantum of steam in condensing increases the temperature of the water to a maximum equal to the saturation temperature of steam at the water pressure in said stage.

4. The subject matter of claim 1 or 2, each in the alternate, wherein alkaline-earth bicarbonate are present in the preheated water; said bicarbonates are decomposed during said thermoprecipitation, forming a precipitate in suspension in the water of alkaline-earth compounds, including calcium carbonate and/or magnesium hydroxide, while carbon dioxide is evolved; and said carbon dioxide is separated from the water in each said stage.

5. The subject matter of claim 4, in which an alkali is added to the water in a stage of thermoprecipitation subsequent to the first stage, whereby undecomposed alkaline-earth bicarbonate in the water is converted to a precipitate in suspension of alkaline-earth carbonate and/or hydroxide.

6. The subject matter of claim 4, in which said water before it has been preheated is deaerated, whereby the presence of non-condensibles in said separated carbon dioxide is reduced.

7. The subject matter of claim 4, in which the before-mentioned quantum of steam is in excess; said excess separates with said carbon dioxide from the water, and is thence condensed and separated from said carbon dioxide.

8. The subject matter of claim 4, wherein said separated carbon dioxide is passed to the water before it has been preheated, and reduces its pH, whereby to prevent the precipitation of alkaline-earth carbonate and/or hydroxide during preheating of the water.

9. The subject matter of claim 8, in which organic vapors are removed from said carbon dioxide before it is passed to said water.

10. The subject matter of claim 4, wherein an acid is added to the water before it has been preheated and reduces its pH, whereby to prevent the precipitation of alkaline-earth carbonate and/or hydroxide during preheating of the water.

11. The subject matter of claim 1 or 2, each in the alternate, wherein an acid is added to the water before it has been preheated; said acid decomposes alkaline-earth bicarbonates dissolved in the water, while evolving carbon dioxide; and said carbon dioxide is separated from the water, whereby to prevent the precipitation of alkaline-earth carbonate and/or hydroxide during said preheating of the water.

12. The subject matter of claim 1 or 2, each in the alternate, wherein efore the water has been preheated calcium ion is at least partially removed from it by ion exchange with sodium in a sodium ion, cationic ion exchanger, whereby the precipitation of calcium sulfate is prevented during said preheating of the water.

13. The subject matter of claim 1 or 2, each in the alternate, wherein said separated precipitate of scale compounds is recirculated to said preheated water, whereby to serve as seed for said thermoprecipitation of scale-forming compounds.

14. The subject matter of claim 1 or 2, each in the alternate, wherein a compound selected from among anhydrite, magnesium hydroxide and a ferric compound is added to said preheated water to serve as seed for said thermoprecipitation of scale-forming compounds.

15. The subject matter of claim 1 or 2, each in the alternate, wherein said flash-cooled, post-thermal water is reduced in temperature to substantially said initial temperature of the water containing said dissolved compounds while preheating it in heat exchange.

16. The subject matter of claim 1 or 2, each in the alternate, wherein said flash-cooled, post-thermal water is reduced in temperature to not less than its boiling point at atmospheric pressure by preheating said water containing said dissolved compounds in heat exchange, and is then evaporated in a vapor compression evaporator, forming evaporator distillate and evaporator concentrate; said evaporator distillate exchanges heat with said preheating water to form fresh water; and said evaporator concentrate exchanges heat with said preheating water to form an end concentrate of dissolved compounds.

17. The subject matter of claim 16, in which said vapor compression evaporator is arranged in stages of increasing concentration of the water; the stage distillates are combined to form evaporator distillate; and the concentrate from the last said stage comprises said evaporator concentrate.

18. The subject matter of claim 16, each in the alternate, wherein an acid is added to the water in said vapor compression evaporator, whereby to decrease the pH of the water to below neutral and prevent the precipitation of magnesium hydroxide in the evaporating water.

19. The subject matter of claim 17, in which to said concentrate is added while it is in one of said stages a seed compound, selected from among anhydrite and the before-mentioned precipitate of scale compounds, whereby to seed the precipitation of anhydrite and effect said precipitation upon existing precipitate instead of on the heat transfer surfaces of said evaporator.

20. The subject matter of claim 1 or 2, each in the alternate, wherein said flash-cooled, post-thermal water is evaporated in a first vapor compression evaporator, forming first evaporator distillate and first evaporator concentrate, which are reduced in temperature to not less than the boiling point at atmospheric pressure of said evaporator concentrate by heat exchange with said preheating water; the temperature-reduced evaporator concentrate is evaporated in a second vapor compression evaporator, forming second evaporator concentrate and second evaporator distillate; said second evaporator distillate is combined with the temperature-reduced first evaporator distillate, and the combined distillates are cooled in heat exchange with said preheating water to form fresh water; and said second evaporator concentrate is cooled in heat exchange with said preheating water to form an end concentrate of dissolved compounds.

21. The subject matter of claim 20, wherein said heat exchange of first evaporator distillate and first evaporator concentrate with said preheating water is conducted in a flash evaporator, and the flash condensate thereof is combined with said combined distillates.

22. The subject matter of claim 16, each in the alternate, wherein said end concentrate of dissolved compounds is employed as a regenerant providing sodium ion in the regeneration of a sodium ion, cationic ion exchanger.

23. The subject matter of claim 20, in which said first vapor compression evaporator is arranged in stages of increasing concentration of the water; the stage distillates thereof are combined to form said first evaporator distillate, and the concentrate from the last stage comprises said first evaporator concentrate.

24. The subject matter of claim 20, each in the alternate, in which an acid is added to the water in said first vapor compression evaporator, and the pH of the water is thereby decreased to below neutral, whereby to prevent the precipitation of magnesium hydroxide in the evaporating water in said first vapor compression evaporator.

25. An apparatus for removing from water containing dissolved compounds the scale-forming part thereof, which comprises a preheating heat exchange means having an outlet for preheated water; a plurality of thermoprecipitation vessels and pump means intercommunicating successive said vessels; said pump means having an inlet connected to an outlet for water containing in suspension a precipitate of scale compounds on a preceding said vessel, and having an outlet for said water containing said suspension connected to an inlet on a succeeding said vessel, except that the inlet to the first of said pump means is connected to said outlet for preheated water; an inlet for a quantum of steam on each said thermoprecipitation vessel; the outlet for said water containing said suspension on the last of said plurality of thermoprecipitation vessels connected to an inlet on a solids separation means, which is provided with an outlet for a precipitate of scale compounds accumulated in said thermoprecipitation vessels and an outlet for post-thermal water; said outlet for post-thermal water connected to an inlet on the first of a plurality of intercommunicating flash vaporization chambers corresponding to said plurality of thermoprecipitation vessels; each said chamber provided with an outlet for flashed vapor connected to an inlet of a vapor compression means having an outlet for compressed vapor, constituting said quantum of steam, connected to said inlet for a quantum of steam; the last of said plurality of flash vaporization chambers provided with an outlet for flash-cooled, post-thermal water containing dissolved compounds substantially removed of scale-forming compounds.

26. An apparatus for removing from water containing dissolved compounds the scale-forming part thereof, which comprises a preheating heat exchange means having an outlet for preheated water; a plurality of thermoprecipitation vessels and combination of pump means and eductor means; said eductor means of said combination following said pump means in flow communication with it; said combination intercommunicating successive said vessels; said pump means having an inlet connected to an outlet for water containing in suspension a precipitate of scale compounds on a preceding said thermoprecipitation vessel; said eductor means having an outlet for said water containing said suspension connected to the inlet of a succeeding said vessel, except that the inlet to the first of said pump means is connected to said outlet for preheated water; an inlet for a quantum of steam on said eductor means at a point of high water velocity and low pressure; the outlet for said water containing said suspension on the last of said plurality of vessels connected to an inlet on a solids separation means, which is provided with an outlet for a precipitate of scale compounds accumulated in said thermoprecipitation vessels and an outlet for post-thermal water; said outlet for post-thermal water connected to an inlet on the first of a plurality of intercommunicating flash vaporization chambers corresponding to said plurality of thermoprecipitation vessels; each said chamber provided with an outlet for flashed vapor, constituting said quantum of steam, connected to said inlet for a quantum of steam; the last of said plurality of flash vaporization chambers provided with an outlet for flash-cooled, post-thermal water containing dissolved compounds substantially removed of scale-forming compounds.

27. The subject matter of claim 25 or 26, each in the alternate, wherein said outlet for flash-cooled, post-thermal water is connected to an inlet on a preheating heat exchange means, having an outlet for temperature-reduced, flash-cooled, post-thermal water; said outlet connected to an inlet on a vapor compression evaporator means, having outlets for evaporator distillate and evaporator concentrate, said outlets communicating with a primary preheating heat exchange means having outlets, respectively, for fresh water and an end concentrate of dissolved compounds.

28. The subject matter of claim 25 or 26, each in the alternate, wherein said outlet for flash-cooled, post-thermal water is connected to an inlet on a first vapor compression evaporator means having outlets for first evaporator distillate and first evaporator concentrate; said outlets communicating with a preheating heat exchange means having outlets, respectively, for temperature-reduced, first evaporator distillate and first evaporator concentrate; said outlet for temperature-reduced, first evaporator concentrate connected to an inlet on a second vapor compression evaporator means having outlets for second evaporator distillate and second vaporator concentrate; said outlets for first and second evaporator distillate communicating with a primary preheating heat exchange means having an outlet for fresh water; and said outlet for second evaporator concentrate communicating with a primary preheating heat exchange means having an outlet for end concentrate of dissolved compounds.

29. The subject matter of claim 28, wherein said preheating heat exchange means comprises a flash evaporator means, which includes an outlet means for flash condensate thereof communicating with said outlet for temperature-reduced, first evaporator distillate.

30. An apparatus for removing from water containing dissolved compounds the scale-forming part thereof, which comprises a preheating heat exchange means having an outlet for preheated water; a thermoprecipitation vessel; a combination of pump means and eductor means, said eductor means following said pump means in flow communication with it; said pump means having an inlet connected to said outlet for preheated water; an inlet for steam on said eductor means at a point of high water velocity and low pressure; an outlet on said eductor means, connected to an inlet on said thermoprecipitation vessel; an outlet on said thermoprecipitation vessel for water containing in suspension a precipitate of scale compounds, connected to an inlet on a solids separation means; an outlet on said solids separation means for a precipitate of scale compounds and an outlet for post-thermal water, connected to an inlet of a flash vaporization chamber; an outlet on said flash vaporization chamber for flashed vapor, constituting said steam, communicating with said inlet for steam on said eductor means; and an outlet on said flash vaporization chamber for flash-cooled, post-thermal water containing dissolved compounds substantially removed of scale-forming compounds.

* * * * *